United States Patent [19]
Okanoue et al.

[11] Patent Number: 5,519,727
[45] Date of Patent: May 21, 1996

[54] ADAPTIVE EQUALIZER

[75] Inventors: Kazuhiro Okanoue; Akihisa Ushirokawa, both of Tokyo, Japan

[73] Assignee: NEC Corporation, Japan

[21] Appl. No.: 171,093

[22] Filed: Dec. 21, 1993

[30] Foreign Application Priority Data

Dec. 25, 1992 [JP] Japan ................... 4-347220

[51] Int. Cl.$^6$ .................................................. H04B 7/005
[52] U.S. Cl. ...................... 375/232; 375/231; 375/348
[58] Field of Search ...................... 375/331–332, 375/347–348, 350; 364/724.16, 724.19, 724.2; 333/18, 28 R

[56] References Cited

U.S. PATENT DOCUMENTS

| | | | |
|---|---|---|---|
| 5,020,078 | 5/1991 | Crespo | 375/233 |
| 5,081,651 | 1/1992 | Kuko | 375/341 |
| 5,127,025 | 6/1992 | Okanoue | 375/232 |
| 5,146,475 | 9/1992 | Kubo | 375/341 |
| 5,150,380 | 9/1992 | Okanoue | 375/236 |
| 5,231,648 | 7/1993 | Driedger et al. | 375/231 |
| 5,251,233 | 10/1993 | Labedz et al. | 375/230 |
| 5,272,727 | 12/1993 | Okanoue | 375/341 |
| 5,293,401 | 3/1994 | Serfaty | 375/231 |
| 5,331,662 | 7/1994 | Desperben et al. | 375/232 |

*Primary Examiner*—Young T. Tse
*Attorney, Agent, or Firm*—Ostrolenk, Faber, Gerb & Soffen

[57] ABSTRACT

An adaptive equalizer estimates a channel impulse response h in a channel impulse response estimator and outputs a result to a channel impulse response convertor. The channel impulse response convertor removes interference components from the channel impulse response h, outputs a channel impulse response h' to an equalizer. The equalizer sets up, based on the channel impulse response vector h', internal parameters, and equalizes, based on the internal parameters, reception signals. By configuring as above, distortion by intersymbol interference and a deterioration of reception performance by co-channel interference waves can be prevented.

14 Claims, 4 Drawing Sheets

ADAPTIVE EQUALIZER

BACKGROUND OF THE INVENTION

The present invention relates generally to an adaptive equalizer, and more specifically, an adaptive equalizer preventing deterioration of reception performance caused by intersymbol interference distortion and co-channel interference waves.

Conventionally, for example, when intersymbol interference and co-channel interference waves exist, a system to improve reception performance using space diversity and an equalizer is known, as disclosed in a paper titled "Co-channel Interference Performance of Diversity Equalization in Mobile Radio" by Hitoshi YOSHINO and Hiroshi SUZUKI, in 1992, The Autumn Meeting of The Electronic Data Academic Society on B-260.

Figure 5:
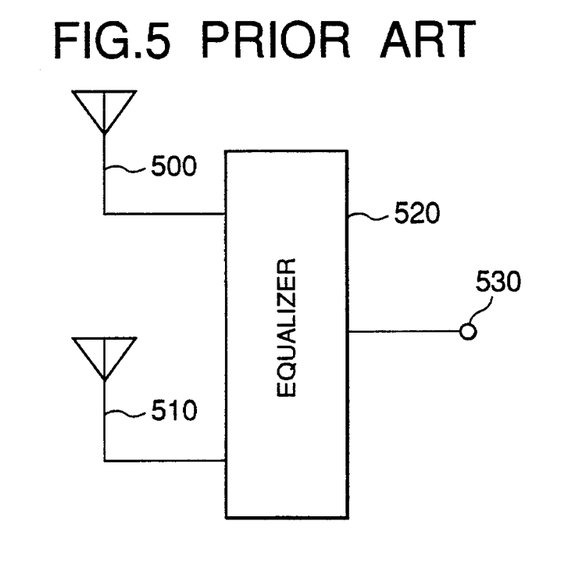
FIG. 5 is the block diagram showing a prior art.

As shown in FIG. 5, this system receives a plurality of signals from a plurality of antennas 500 and 510, equalizes and synthesizes these received signals in an equalizer 520, then performs demodulation. By using this system, reception performance despite co-channel interference waves is improved.

The improvement of reception performance despite co-channel interference waves, however, is obtained by space diversity. Therefore, in this case, there is a problem that the configuration of the receiver becomes complicated by the diversity.

On the other hand, in case of equalizing signals while estimating a channel impulse response, when a co-channel interference wave exists a channel impulse response estimator locks to the co-channel interference wave and estimates a different channel impulse response from the actual channel impulse response. As a result, the system equalizes reception signals with the wrong channel impulse response. Therefore, the reception performance of the system is greatly deteriorated.

SUMMARY OF THE INVENTION

An object of the present invention is to provide an adaptive equalizer solving the above problems without complicating the configuration thereof.

Another object of the present invention is to provided an adaptive equalizer preventing distortion by intersymbol interference and deterioration of reception performance by co-channel interference waves, not using a diversity system.

The above objects are achieved by an adaptive equalizer comprising:

a channel impulse response vector calculator means for estimating a channel impulse response h from reception signals and calculating a channel impulse response vector h' by removing interference components from the estimated path impulse response h; and an equalizer means for receiving the reception signals and the channel impulse response vector h', setting an internal parameter using the channel impulse response vector h' and then equalizing the reception signals based on the internal parameter. It is desirable that the adaptive equalizer comprises a maximum likelihood sequence estimator.

Moreover, it is desirable that the channel impulse response vector calculator means comprises means receiving the reception signals, equalizating the reception signals in the equalizer means, and estimating the channel impulse response h using the equalization result and the reception signals.

Further, it is desirable that the channel impulse response vector calculator means comprises:

a channel impulse response estimator means for receiving the reception signals and the equalization result and estimating a channel impulse response vector h; and a channel impulse response convertor means for receiving the channel impulse response h and converting the channel impulse response h to the channel impulse response h' from which the interference components are removed.

Moreover, it is desirable that the channel impulse response estimator means comprises a transversal filter.

Additionally, it is desirable that the channel impulse response estimator means comprises:

a channel impulse response estimator circuit receiving the reception signals and the equalization result and estimating the channel impulse response h;

a training signal detector means for detecting training signals from the input reception signals;

an equalization result output means for outputting the equalization result corresponding to the training signals; and a switching means for receiving the equalization result from the equalization result output means and the equalization result of the reception signals and outputting an equalization result from the equalization result output means to the channel impulse response estimator circuit when training signals have been detected based on a detection signal from the training signal detector means, and outputting an equalization result of the reception signals to the channel impulse response estimator circuit when training signals have not been detected.

Moreover, it is desirable that the channel impulse response convertor means comprises:

a plurality of absolute value operation means for receiving each component of the channel impulse response h, and calculating and outputting an absolute value of each component;

a first maximum value detector means for detecting and outputting a first maximum value among absolute values output from the plurality of absolute value operation means and specifying an absolute value operation means that has output the first maximum value;

a gate means for inputting absolute values output from the plurality of absolute value operation means and passing absolute values except for the first maximum value based on a specification signal from the first maximum value detector means;

a second maximum value detector means for receiving the absolute values that have passed the gate means, detecting a second maximum value among the absolute values that have passed the gate means and outputting the second maximum value;

a divider means for receiving the first maximum value and the second maximum value and calculating a ratio of the first maximum value and the second maximum value;

a weight controller means for receiving the ratio calculated in the divider means and the specification signal from output from the first maximum value detector means and outputting a weight coefficient corresponding to each component of the channel impulse response h; and a plurality of multiplier means for multiplying the weight coefficient that has been output from the weight controller means and the each component of the channel impulse response h.

Moreover, it is desirable that the weight controller means comprises:

a weight coefficient memory means for storing a plurality of weight coefficients;

a selector means for outputting only one weight coefficient among the plurality of weight coefficients; and a controller means for receiving the specification signal from the first maximum value detector means and said ratio output from the divider section and outputting a control signal indicating a weight coefficient to be output to the selector.

Furthermore, it is desirable that the weight controller means comprises:

a threshold value memory means for storing a threshold value;

a weight coefficient memory section storing two weight coefficients;

a selector means for outputting a weight coefficient stored in the weight coefficient memory means;

a comparison section comparing the threshold value and the ratio output from the divider means and outputting a comparison; and a controller means for receiving the comparison result and the specification signal from the first maximum value detector means and outputting a control signal indicating a weight coefficient to be output to the selector means.

By configuring as above, when transferring data via a communication path where co-channel interference waves exist and a distortion by intersymbol interference occurs, the problem that an equalizer is improperly-locked to co-channel interference waves when levels of reception signals decreased can be prevented and reception performance thereof can be improved without using a diversity system.

Also, because the present invention does not use a diversity system, the configuration of the receiver is simple.

DETAILED DESCRIPTION OF THE INVENTION

The embodiments of the present invention are now explained with reference to the drawings.

Figure 1:
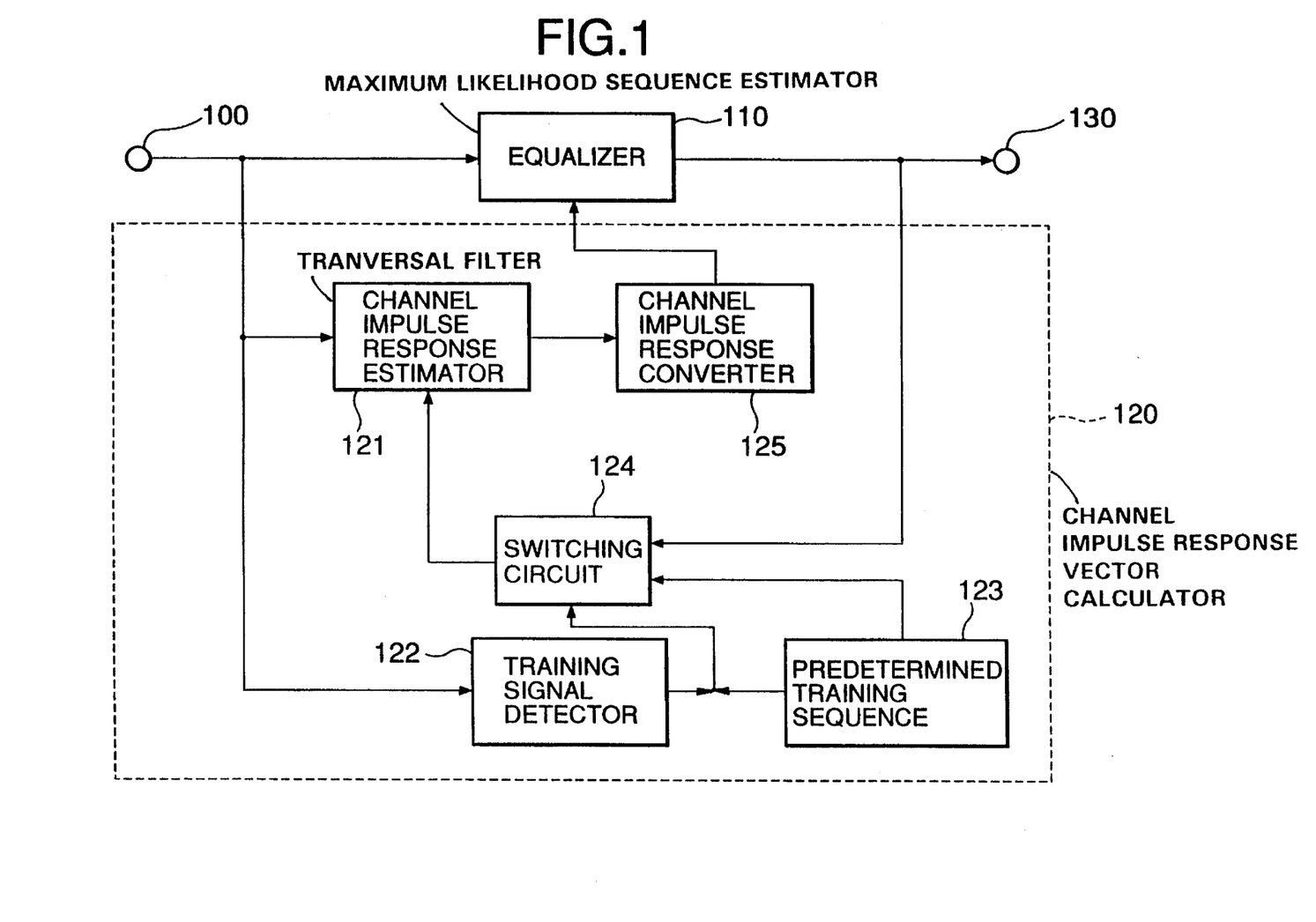
FIG. 1 is a block diagram showing an embodiment of the present invention.

FIG. 1 is a block diagram showing an embodiment of the present invention. In this figure, 100 is an input terminal receiving reception signals, 110 is an equalizer, 120 is a channel impulse response calculator, 130 is an output terminal outputting equalized reception signals.

The equalizer 110 is configured as a maximum likelihood sequence estimator as shown, for example, in the paper "Digital Communications" Second Edition, 1989 by J. G. Proakis and in a U.S. Pat. No. 5,127,025 "Space Diversity TDMA Receiver" by Mr. OKANOUE, one of the inventors of the present invention. In this configuration, reception signals input therein are equalized based on internal parameters. Moreover, each internal parameter is set by each component of a channel impulse response h' described later on.

Based on reception signals and an equalization result of the reception signals, the channel impulse response calculator 120 calculates a channel impulse response h' consisting of N components, from which all interference components are removed.

The channel impulse response calculator 120 is configured by a channel impulse response estimator 121, a training signal detector 122, a training sequence generating circuit 123, switching circuit 124 and a channel impulse response convertor 125.

The channel impulse response estimator 121 is configured as a transversal filter as shown, for example, in FIG. 6.7.5 in the paper "Digital Communications" Second Edition 1989, by J. G. Proakis.

Also, it is possible to estimate a channel impulse response h by an way to estimate based only on reception signals as shown, for example, in the paper "A Study of Blind Viterbi Equalization Algorithm" by FURUYA, USHIROKAWA, ISA and SATO, A-141 for The Spring Meeting of the Electronic data and communication Academic Society, 1991. However, to estimate more accurately the channel impulse response h, this invention is configured to use not only reception signals but also equalization results of reception signals and training signals.

Training signal detector 122 is configured to output a detection signal by detecting training signals in reception signals.

The training sequence generating circuit 123, which stores an equalization result of preset training signals, is configured to output the predetermind training sequence to the switching circuit 124.

The switching circuit 124 receives a predetermined training sequence from the training sequence generating circuit 123 and another equalization result of reception signals, and outputs one of them based on a detection signal from the training signal detector 122.

By the above configuration, the predetermined training sequence from the training sequence generating circuit 123 in the case that the training signal detector 122 has detected a training signal or an equalization result of reception signals in the case that the training signal detector 122 has not detected a training signal, is input to the channel impulse response estimator 121 by selection in switching circuit 124.

Based on these equalization results, the channel impulse response estimator 121 estimates a channel impulse response h consisting of N components, then outputs it to the channel impulse response convertor 125.

Next, a configuration of the channel impulse response convertor 125 is explained.

Figure 2:
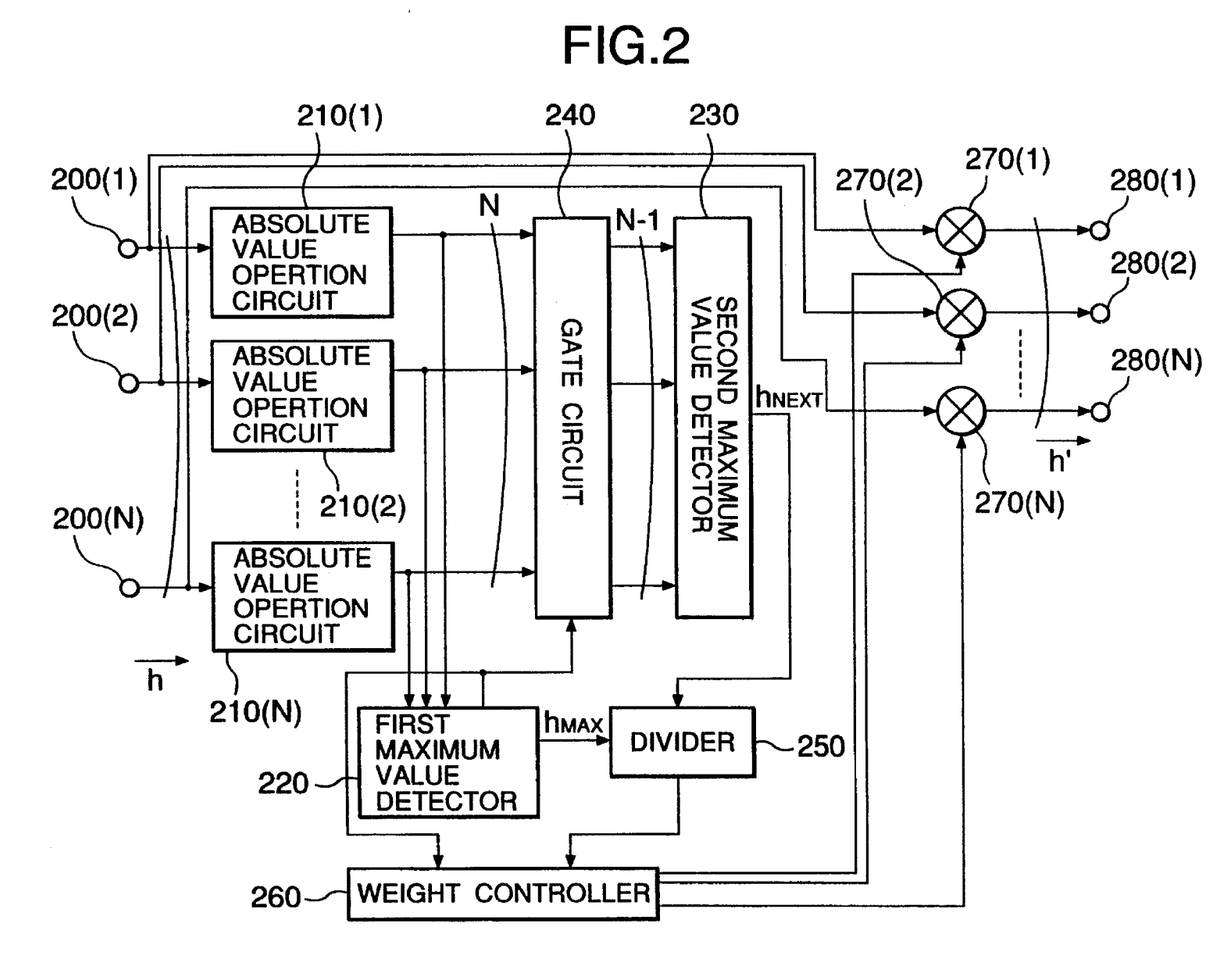
FIG. 2 is a block diagram showing a configuration of the channel impulse response convertor section of the present invention.

FIG. 2 is a block diagram showing a configuration of the channel impulse response convertor 125. In this figure, 200(1) to 200(N) are input terminals, 210(1) to 210(N) are absolute value operation circuits, 220 is a first maximum value detector, 230 is a second maximum value detector, 240 is a gate circuit, 250 is a divider, 260 is a weight controller, 270(1) to 270(N) are multipliers and 280(1) to 280(N) are output terminals.

The channel impulse response convertor 125 removes interference components from a received channel impulse response h and converts this to a channel impulse response h'.

This channel impulse response convertor 125 is configured by input terminals 200(1) to 200(N), absolute value operation circuits 210(1) to 210(N), a first maximum value detector 220, a second maximum value detector 230, a gate circuit 240, a divider 250, a weight controller 260 and multipliers 270(1) to 270(N).

The input terminals 200(1) to 200(N) are configured to input each component of a channel impulse response h.

The absolute value operation circuits 210(1) to 210(N) are configured to receive each component of the channel impulse response h through the input terminals 200(1) to 200(N), calculate each absolute value of each component and output the results to the first maximum value detector 220 and the gate circuit 240.

The first maximum value detector 220 is configured to detect the first maximum value ($h_{max}$) among N absolute values received therein and output $h_{max}$ to the divider 250. Moreover, it outputs an operation circuit specification signal specifying the absolute value operation section that has output the first maximum value to the gate circuit 240 and the weight controller 260.

The gate circuit 240 is configured to gate only one absolute value that is the first maximum value ($h_{max}$) among absolute values of respective components received therein based on the operation circuit specification signal, and output (N-1) absolute values to the second maximum value detector 230.

The second maximum value detector 230 is configured to detect the largest value that is the second maximum value ($h_{NEXT}$) among (N-1) absolute values received therein, and output it to the divider 250.

The divider 250 is configured to calculate a ratio of the first maximum value ($h_{max}$) and the second maximum value ($h_{NEXT}$) that is ($h_{max}/h_{NEXT}$), and output the result to the weight controller 260.

The weight controller 260 is configured to calculate each weight coefficient corresponding to each component of the channel impulse response h using the ratio ($h_{max}/h_{NEXT}$) and the operation circuit specification signal, and output the results to the multipliers 270(1) to 270(N). The configuration of the weight controller 260 is explained later in detail.

The multipliers 270(1) to 270(N) are configured to multiply each weight coefficient obtained in the weight controller 260 and each component of the channel impulse response h input through the input terminals 200(1) to 200(N), output the results to the output terminals 280(1) to 280(N).

By the channel impulse response convertor 125 thus configured, each component of the channel impulse response h is multiplied by each weight coefficient and interference components are removed, and thus a channel impulse response h' is calculated. Then, the channel impulse response h' is input to the equalizer 110.

The equalizer 110 sets up internal parameters based on the channel impulse response h' input therein, and equalizes reception signals using the internal parameters.

Next, the configuration of the weight controller 260 mentioned above is explained in detail.

Figure 3:
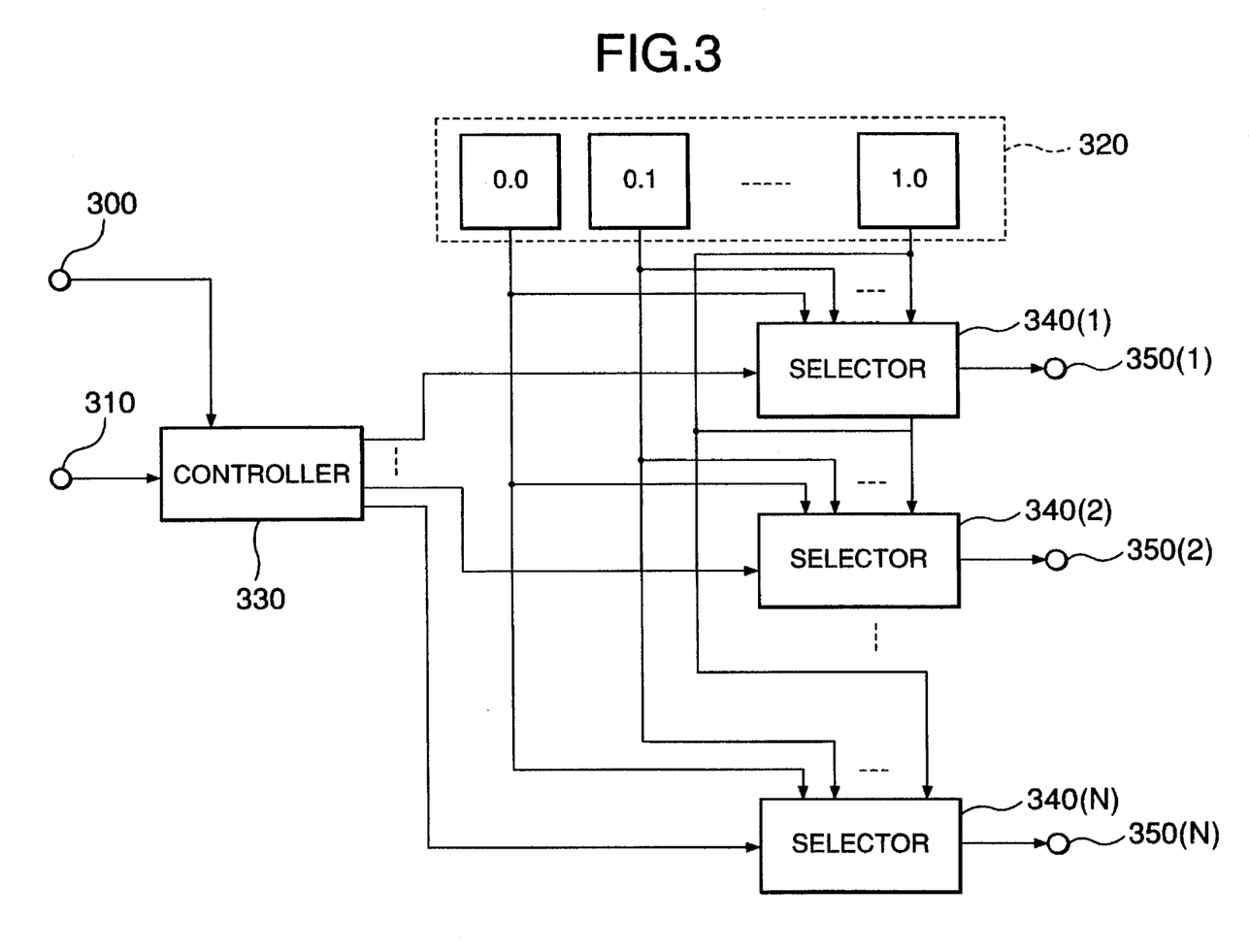
FIG. 3 is a block diagram of a weight controller of the present invention.

FIG. 3 is a block diagram of the weight controller 260. In this figure, 300 and 310 are input terminals, 320 is a weight coefficient memory, 330 is a controller, 340(1) to 340(N) are selectors and 350(1) to 350(N) are output terminals.

The input terminal 300 receives the ratio ($h_{max}/h_{NEXT}$) from the divider 250, and the input terminal 310 receives an operation circuit specification signal from the first maximum value detector 220.

The weight coefficient memory 320 is configured to store a plurality of weight coefficients and output these weight coefficients to the selectors 340(1) to 340(N).

The controller 330 is configured to estimate interference components based on the ratio ($h_{max}/h_{NEXT}$) received therein and output a control signal to the selectors 340(1) to 340(N) based on the operation circuit specification signal.

The selectors 340(1) to 340(N) are configured to output, based on the control signal from the controller 330, only one weight coefficient among weight coefficients received therein.

Next, the operation of the weight controller 260 thus configured is explained.

The controller 330 estimates magnitude of interference components based on the ratio ($h_{max}/h_{NEXT}$) received therein. That is, it decides that interference components are small when the ratio ($h_{max}/h_{NEXT}$) is large, or it decides that interference components are large when the ratio ($h_{max}/h_{NEXT}$) is small. On the other hand, it specifies, based on the operation circuit specification signal, a selector to be received the first maximum value ($h_{max}$).

Then, the controller outputs a control signal that indicates the selector to output the maximum value among the weight coefficients received from the weight controller 330. Additionally, it outputs a control signal that indicates each selector to output the smaller value among the weight coefficients received from the weight controller 330 when the ratio ($h_{max}/h_{NEXT}$) is large or the larger value among the weight coefficients input from the weight controller 330 when the ratio ($h_{max}/h_{NEXT}$) is small.

Thus, the respective weight coefficients corresponding to respective components of the channel impulse response h are output from the output terminals 350(1) to 350(N) and received to the multipliers 270(1) to 270(N).

Figure 4:
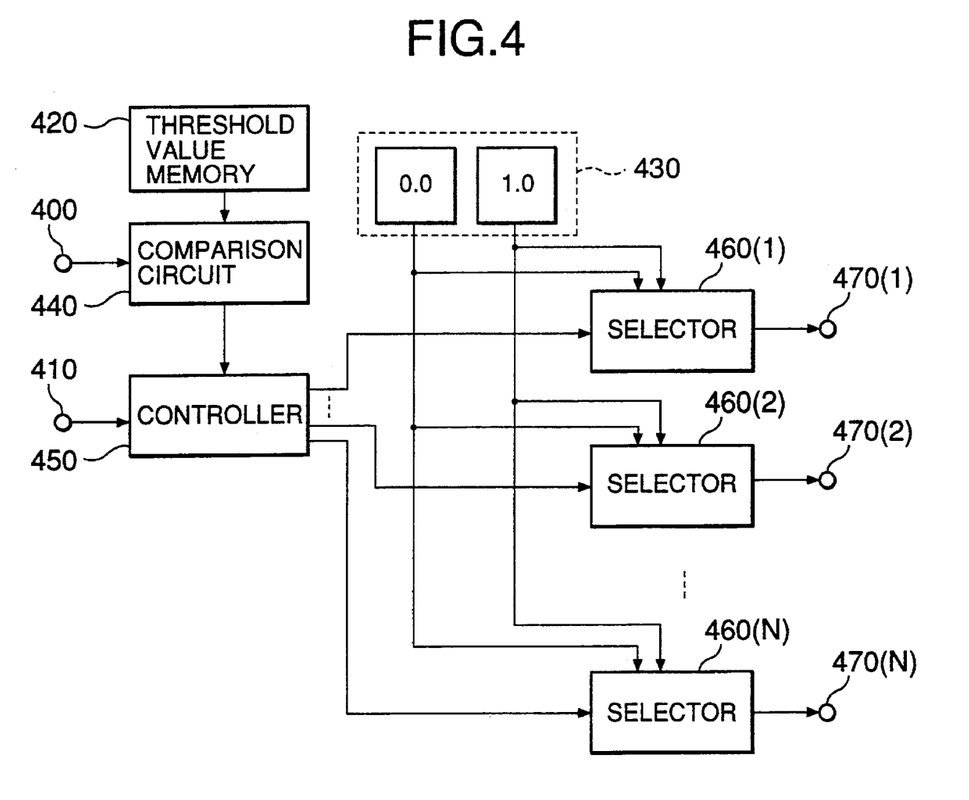
FIG. 4 is a block diagram of a weight controller of another embodiment of the present invention.

Next, another embodiment of the weight controller 260 is explained.

FIG. 4 is a block diagram showing another embodiment of the weight controller 260.

In this figure, 400 and 410 are received terminals, 420 is a threshold value memory, 430 is a weight coefficient memory, 440 is a comparison circuit, 450 is a controller, 460(1) to 460(N) are selectors and 470(1) to 470(N) are output terminals.

The received terminal 400 receives the ratio ($h_{max}/h_{NEXT}$) from the divider 250, and the received terminal 410 receives the operation circuit specification signal from the first maximum value detector 220.

The threshold value memory 420 is configured to store a preset threshold value and output it to the comparison circuit 440.

The weight coefficient memory 430 is configured to store 1 and 0 as weight coefficients, output them to the selectors 460(1) to 460(N).

The comparison circuit 440 is configured to compare the threshold value and the ratio ($h_{max}/h_{NEXT}$) input from the divider 250 through the received terminal 400, and output the comparison result to the controller 450.

The controller 450 is configured to output, based on the comparison result and the operation circuit specification signal from the first maximum value detector 220, a control signal to the selectors 460(1) to 460(N).

Next, the operation of the weight controller 260 thus configured is explained.

Firstly, the controller 450 compares a ratio ($h_{max}/h_{NEXT}$) and a threshold value.

Then, it decides that interference components are small when the ratio ($h_{max}/h_{NEXT}$) is larger than the threshold value and outputs a control signal that indicates to output a weight coefficient not to convert each component of the channel impulse response h, that is 1, to the selectors 460(1) to 460(N).

On the other hand, it decides that interference components are large when the ratio ($h_{max}/h_{NEXT}$) input therein is smaller than the threshold value, and outputs, based on the operation circuit specification signal, a control signal that indicates to output the weight coefficient 1 to a selector corresponding to the specified absolute value operation and the weight coefficient 0 to the other selectors.

The selectors 460(1) to 460(N) received the control signal, and based on the control signal, outputs a weight coefficient corresponding to each component of the channel impulse response h to the output terminals 470(1) to 470(N).

Then, the weight coefficients output from the weight controller 260 configured as above are received to the multipliers 270(1) to 270(N).

What is claimed is:

1. An adaptive equalizer comprising:

a channel impulse response estimator for receiving reception signals and equalization results of said reception signals and generating an estimated channel impulse response h by estimating a channel impulse response h from the reception signals and the equalization results;

a channel impulse response converter for receiving said estimated channel impulse response h and converting said channel impulse response h to a channel impulse response h' by removing interference components from said channel impulse response h, said channel impulse response converter comprising:

a plurality of absolute value operation sections for receiving each component of said estimated channel impulse response h, and calculating and outputting an absolute value of said each components, a first maximum value detector for detecting and outputting a first maximum value among absolute values output from said plurality of absolute value operation sections and identifying one of said plurality of absolute value operation sections that has output said first maximum value, a gate for receiving absolute values from said plurality of absolute value operation sections and passing all of said absolute values except for said first maximum value identified by an identification signal output from said first maximum value detector, a second maximum value detector for receiving said absolute values output from said gate, detecting a second maximum value among said absolute values output from said gate and outputting said second maximum value, a divider for receiving said first maximum value and said second maximum value and calculating a ratio of said first maximum value and said second maximum value, a weight controller for receiving said ratio of said first maximum value and said second maximum value and said identification signal from said first maximum value detector and outputting weight coefficients respectively corresponding to each component of said estimated channel impulse response h, and a plurality of multipliers for multiplying each of said weight coefficients output from said weight controller and a respective one of said each component of said estimated channel impulse response h; and an equalizer for setting an internal parameter based on said channel impulse response h' equalizing said reception signals based on said internal parameter and outputting said equalization results to said channel impulse response estimator.

2. The adaptive equalizer of claim 1, wherein said weight controller comprises:

a weight coefficient memory for storing a plurality of weight coefficients;

a selector for outputting only one weight coefficient among said plurality of weight coefficients; and a controller for receiving said identification signal from said first maximum value detector and said ratio from said divider and outputting a control signal indicating said weight coefficient to be output to said selector.

3. The adaptive equalizer of claim 1, wherein said weight controller comprises:

a threshold value memory for storing a threshold value;

a weight coefficient memory section storing two weight coefficients;

a selector for outputting one of said two weight coefficients stored in said weight coefficient memory section;

a comparison section comparing said threshold value and said ratio from said divider and outputting a comparison result; and a controller for receiving said comparison result and said identification signal output from said first maximum value detector and outputting a control signal identifying one of said two weight coefficients that is to be output by said selector.

4. An adaptive equalizer comprising:

a training signal detector section for receiving reception signals and detecting a training signal contained in said reception signals;

a training sequence output section for outputting a training sequence corresponding to said training signal when said training signal detector section has detected said training signal;

a switching section for receiving said training sequence and an equalization result of at least one of said reception signals from an equalizer, outputting said training sequence when said training signal has been detected based on a detection signal from said training signal detector section and outputting said equalization result of said at least one of said reception signals when said training signal is not detected;

a channel impulse response estimator for receiving said reception signals, for receiving said training sequence and said equalization result of said reception signals from said switching section, and for estimating a channel impulse response h as a function of said reception signals, said training sequence and said equalization result; and a channel impulse response converter for receiving said estimated channel impulse response h and said equalization result and for converting said estimated channel impulse response h to a channel impulse response h' by removing interference components from said estimated channel impulse response h;

said equalizer setting an internal parameter based on said channel impulse response h', equalizing said reception signals based on said internal parameter and outputting said equalization result to said switching section for delivery to said channel impulse response estimator.

5. An adaptive equalizer comprising:

a training signal detector section for detecting a training signal included in reception signals received to said training signal detector section;

a training sequence output section for storing a training sequence corresponding to one of said reception signals and outputting said training sequence when said training signal detector section has detected said training signal;

a switching section for receiving an equalization result of said one of said reception signals and said training sequence corresponding to said one of said reception signals, outputting said training sequence when said training signal detector section has detected said training signal, and outputting said equalization result of said one of said reception signals when said training signal detector section does not detect said training signal;

a channel impulse response estimator section for estimating a channel impulse response h from said reception signals and an output from said switching section;

a plurality of absolute value operation sections for receiving each component of said estimated channel impulse response h and calculating and outputting an absolute value of said each component;

a first maximum value detector section for detecting and outputting a first maximum value among absolute values output from said plurality of absolute value operation sections and for outputting an identification signal identifying one of said absolute value operation sections that has output said first maximum value;

a gate section for receiving said absolute values from said plurality of absolute value operation sections and passing all of said absolute values except for said first maximum value identified by said identification signal;

a second maximum value detector section for receiving said absolute values output from said gate section, detecting a second maximum value among said absolute values output from said gate section and outputting said second maximum value;

a divider section for receiving said first maximum value and said second maximum value and calculating a ratio of said first maximum value and said second maximum value;

a weight controller section for receiving said ratio calculated in said divider section and said identification signal from said first maximum value detector section and outputting weight coefficients respectively corresponding to each component of said estimated channel impulse response h; and a plurality of multiplier sections for multiplying each of said weight coefficients output from said weight controller section and a respective one of said each component of said estimated channel impulse response h; and an equalizer for receiving said reception signals, setting an internal parameter based on said each component of said estimated channel impulse response h, equalizing said at least one of said reception signals based on said internal parameter and outputting said equalization result to said switching section.

6. The adaptive equalizer of claim 5, wherein said weight controller section comprises:

a weight coefficient memory section for storing a plurality of weight coefficients;

a selector section for receiving said plurality of weight coefficients stored in said weight coefficient memory section and outputting only one of said plurality of weight coefficients; and a controller section for receiving said identification signal from said first maximum value detector section and said ratio from said divider section and outputting a control signal identifying said one of said plurality of weight coefficients to be output to said selector section.

7. The adaptive equalizer of claim 5, wherein said weight controller section comprises:

a threshold value memory section for storing a threshold value;

a weight coefficient memory section for storing at least two weight coefficients;

a selector section for outputting one of said at least two weight coefficients stored in said weight coefficient memory section;

a comparison section comparing said threshold value and said ratio from said divider section and outputting a comparison result; and a controller section for receiving said comparison result and said identification signal from said first maximum value detector section and outputting a control signal identifying said one of said at least two weight coefficients that is output from said selector section.

8. An adaptive equalizer comprising:

input means for inputting a plurality of reception signals;

a training signal detector section for detecting a training signal included in one of said plurality of reception signals received to said training signal detector;

a training sequence output section for outputting a training sequence corresponding to said one of said plurality of reception signals when said training signal detector section has detected said training signal;

a switching section for receiving an equalization result of said one of said plurality of reception signals and said training sequence corresponding to said one of said plurality of reception signals, outputting said training sequence when said training signal detector section has detected said training signal and outputting said equalization result when said training signal detector section has not detected said training signal;

a channel impulse response estimator for estimating a channel impulse response h from said plurality of reception signals and an output from said switching section;

a channel impulse response converter for receiving said channel impulse response h and converting said estimated channel impulse response h to a channel impulse response h' by removing interference components from said channel impulse response h', and an equalizer for receiving said plurality of reception signals from said received means, setting an internal parameter based on said channel impulse response h' equalizing said one of said plurality of reception signals based on said internal parameter and outputting said equalization result of said one of said plurality of reception signals to said switching section.

9. An adaptive equalizer comprising:

a channel impulse response estimator for estimating a channel impulse response h based on a training signal sequence corresponding to at least one reception signal and a training signal included in said reception signal when said training signal has been detected in said reception signal and estimating said channel impulse response h based on said reception signal and an equalization result of said reception signal when said training signal has not been detected in said reception signal;

a plurality of absolute value operation sections for receiving each component of said estimated channel impulse response h, calculating and outputting an absolute value of said each component;

a first maximum value detector section for detecting a first maximum value of absolute values output from said absolute value operation sections, outputting said first maximum value and an identification signal identifying one of said absolute value operation sections that has output said first maximum value;

a gate section for receiving absolute values output from said plurality of absolute value operation sections and passing all of said absolute values except for said first maximum value identified by said identification signal;

a second maximum value detector section for receiving said absolute values that have been passed through said gate section, detecting a second maximum value among said absolute values that have been passed through said gate section and outputting said second maximum value;

a divider section for receiving said first maximum value and said second maximum value and calculating a ratio of said first maximum value and said second maximum value;

a weight controller section for receiving said ratio calculated in said divider section and said identification signal from said first maximum value detector section and outputting weight coefficients corresponding to each component of said estimated channel impulse response h;

a plurality of multiplier section for multiplying each of said weight coefficients output from said weight controller section and a respective one of said each component of said estimated channel impulse response h and outputting an impulse response h'; and an equalizer for setting an internal parameter based on said channel impulse response h', equalizing said reception signal based on said internal parameter and outputting said equalization result of said reception signals.

10. The adaptive equalizer of claim 9, wherein said weight controller section comprises:

a weight coefficient memory section for storing a plurality of weight coefficients;

a selector section for receiving said plurality of weight coefficients stored in said weight coefficient memory, and outputting only one of said plurality of weight coefficients; and a controller section for receiving said identification signal from said first maximum value detector section and said ratio from said divider section and outputting a control signal indicating said one of said plurality of weight coefficients to be output by said selector.

11. The adaptive equalizer of claim 9, wherein said weight controller section comprises:

a threshold value memory section for storing a threshold value;

a weight coefficient memory section for storing at least two weight coefficients;

a selector section for outputting one of said at least two weight coefficients stored in said weight coefficient memory section;

a comparison section comparing said threshold value and said ratio from said divider section and outputting a comparison result; and a controller section for receiving said comparison result and said identification signal from said first maximum value detector section and outputting a control signal identifying said weight coefficient that is output from said selector section.

12. An adaptive equalizer comprising:

a plurality of absolute value operation sections for receiving each component of an estimate channel impulse response h, calculating and outputting an absolute value of said each component;

a first maximum value detector section for detecting a first maximum value from absolute values output from said plurality of absolute value operation sections and outputting said first maximum value and an identification signal identifying one of said plurality of absolute value operation sections that has output said first maximum value;

a gate section for receiving absolute values from said absolute value operation sections and passing all of said absolute values except for said first maximum value identified by said identification signal;

a second maximum value detector section for receiving said absolute values that have been passed through said gate section, detecting a second maximum value among said absolute values that have been passed through said gate section and outputting said second maximum value;

a divider section for receiving said first maximum value and said second maximum value and calculating a ratio of said first maximum value and said second maximum value;

a weight controller section for receiving said ratio calculated in said divider section and said identification signal from said first maximum value detector section and outputting weight coefficients corresponding to each component of said estimated channel impulse response h;

a plurality of multiplier sections for multiplying each of said weight coefficients output from said weight controller section and a respective one of said each component of said estimated channel impulse response h; and an equalizer for setting an internal parameter based on said estimated channel impulse response h and equalizing reception signals based on said internal parameter.

13. The adaptive equalizer of claim 12, wherein said weight controller section comprises:

a weight coefficient memory section for storing a plurality of weight coefficients;

a selector section for receiving said plurality of weight coefficients stored in said weight coefficient memory and outputting only one of said plurality of weight coefficients; and a controller section for receiving said identification signal from said first maximum value detector section and said ratio from said divider section and outputting a control signal for identifying said one of said weight coefficients to be output by said selector section.

14. The adaptive equalizer of claim 12 wherein said weight controller section comprises:

a threshold value memory section for storing a threshold value;

a weight coefficient memory section storing at least two weight coefficients;

a selector section for outputting one of said at least two weight coefficients stored in said weight coefficient memory section;

a comparison section for comparing said threshold value and said ratio from said divider section and outputting a comparison result; and a controller section for receiving said comparison result and said identification signal from said first maximum value detector section and outputting a control signal for identifying said one of said at least two weight coefficients output from said selector section.

* * * * *